US011470216B2

(12) United States Patent
Sasaki (10) Patent No.: US 11,470,216 B2
(45) Date of Patent: Oct. 11, 2022

(54) IMAGE FORMING APPARATUS WITH OPERATION BASED UPON A LOGIN STATE AND CONTROL METHOD FOR SAME

(71) Applicant: TOSHIBA TEC KABUSHIKI KAISHA, Tokyo (JP)

(72) Inventor: Takahiro Sasaki, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 16/516,554

(22) Filed: Jul. 19, 2019

(65) Prior Publication Data
US 2020/0137255 A1 Apr. 30, 2020

(30) Foreign Application Priority Data

Oct. 25, 2018 (JP) .............................. JP2018-200812

(51) Int. Cl.
*H04N 1/00* (2006.01)
*H04N 1/44* (2006.01)

(52) U.S. Cl.
CPC ....... *H04N 1/00938* (2013.01); *H04N 1/0097* (2013.01); *H04N 1/00925* (2013.01); *H04N 1/442* (2013.01); *H04N 1/4413* (2013.01); *H04N 1/4433* (2013.01); *H04N 2201/0094* (2013.01)

(58) Field of Classification Search
CPC .......... H04N 1/00938; H04N 1/00925; H04N 1/4433; H04N 1/4406; H04N 1/00854
See application file for complete search history.

(56) References Cited

U.S. PATENT DOCUMENTS

| | | | | |
|---|---|---|---|---|
| 2007/0139701 A1* | 6/2007 | Nomura | ............. | H04N 1/32144 358/1.15 |
| 2014/0333950 A1* | 11/2014 | Kikuchi | ............... | H04N 1/4433 358/1.13 |
| 2014/0337970 A1* | 11/2014 | Yamada | .................. | G06F 21/31 726/19 |

(Continued)

FOREIGN PATENT DOCUMENTS

| | | |
|---|---|---|
| EP | 2 977 896 A1 | 1/2016 |
| JP | 2006-106940 A | 4/2006 |
| JP | 2012-134755 A | 7/2012 |

OTHER PUBLICATIONS

Extended European Search Report issued in European Patent Application No. 19191195.7 dated Mar. 18, 2020 (8 pages).

*Primary Examiner* — Benjamin O Dulaney
(74) *Attorney, Agent, or Firm* — Foley & Lardner LLP (57) ABSTRACT

In accordance with an embodiment, an image forming apparatus comprises a storage section configured to store a setting indicating one of a first condition for permitting start of an application both in a login state and in a logout state and a second condition for permitting start of the application only in the login state; a receiving section configured to receive an instruction to start the application; and a control section configured to start the application if the first condition is set for the application or start the application on condition that the image forming apparatus is in the login state if the second condition is set for the application in response to a start instruction in a logout state.

20 Claims, 5 Drawing Sheets

(56) References Cited

U.S. PATENT DOCUMENTS

| | | | |
|---|---|---|---|
| 2016/0014113 A1* | 1/2016 | Akiyoshi | G06F 9/547 |
| | | | 726/10 |
| 2016/0065788 A1* | 3/2016 | Hosoda | H04N 1/4433 |
| | | | 358/1.13 |
| 2017/0118377 A1* | 4/2017 | Takeda | H04N 1/4433 |
| 2017/0269917 A1* | 9/2017 | Matsushima | H04N 1/4433 |
| 2018/0183964 A1* | 6/2018 | Tamura | H04N 1/00915 |
| 2020/0007713 A1* | 1/2020 | Sasagawa | H04N 1/444 |

* cited by examiner

IMAGE FORMING APPARATUS WITH OPERATION BASED UPON A LOGIN STATE AND CONTROL METHOD FOR SAME

CROSS-REFERENCE TO RELATED APPLICATION

This application is based upon and claims the benefit of priority from Japanese Patent Application No. 2018-200812, filed Oct. 25, 2018, the entire contents of which are incorporated herein by reference.

FIELD

Embodiments described herein relate generally to an image forming apparatus and a control method.

BACKGROUND

A known image forming apparatus is capable of installing various applications. In such an image forming apparatus, only a user after log-in can use the application. However, it is difficult to enable the user after log-in to use only a specific application among the installed applications.

DETAILED DESCRIPTION

In accordance with an embodiment, an image forming apparatus comprises a storage section configured to store settings of an application; and a control section. The control section starts the application when the image forming apparatus is in a login state in response to an instruction to start the application. The control section starts the application when the image forming apparatus is not in the login state and the setting indicates a first state in response to the instruction to start the application. The control section starts an authentication processing when the image forming apparatus is not in the login state and the setting indicates a second state in response to the instruction to start the application. The control section starts the application if the authentication is successfully performed and the image forming apparatus enters the login state, or does not start the application if the authentication is not successfully performed and the image forming apparatus does not enter the login state.

Hereinafter, an image forming apparatus according to several embodiments is described with reference to the accompanying drawings. In the respective figures used in the description of the following embodiments, the configuration may be omitted for the convenience of description.

First Embodiment

Figure 1:
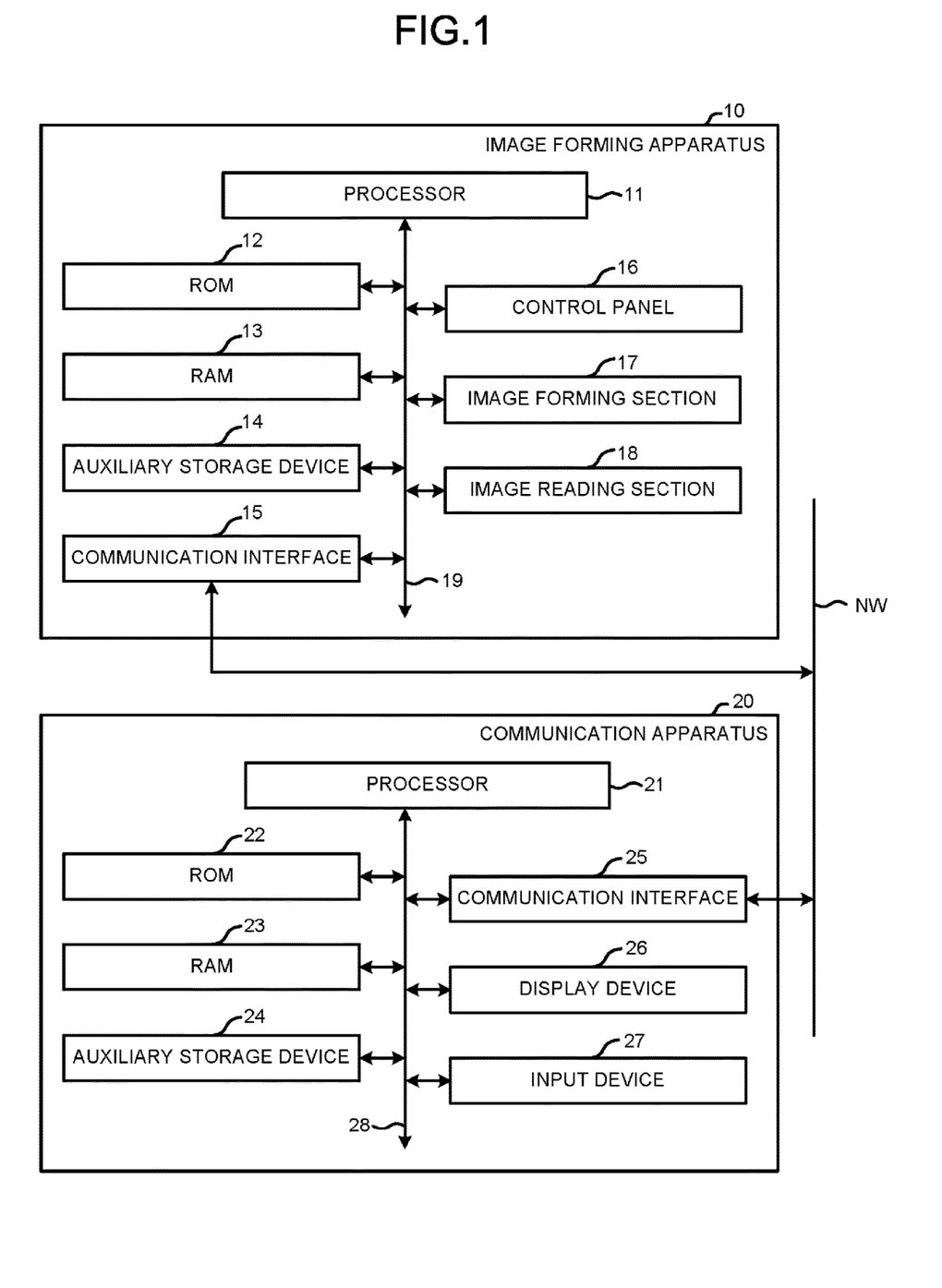
FIG. 1 is a block diagram illustrating an example of circuit configurations of main components of an image forming apparatus and a communication apparatus according to first and second embodiments.

FIG. 1 is a block diagram illustrating an example of circuit configurations of main components of an image forming apparatus 10 and a communication apparatus 20 according to the first embodiment.

The image forming apparatus 10 and the communication apparatus 20 are connected to a network NW. The network NW is typically a private network such as the Intranet. The network NW is typically a Local Area Network (LAN). The network NW may be the Internet. The network NW may be a Wide Area Network (WAN). The network NW may be a wireless line or a wired line, or a combination of the wireless line and the wired line. The network NW may be a dedicated line or a public mobile telephone network.

The image forming apparatus 10 is, for example, a Multi-Function Peripheral (MFP), a copy machine, a printer or a facsimile. For example, the image forming apparatus 10 includes a printing function, a scanning function, a copy function, a decoloring function, a facsimile function, and the like. The printing function is a function of forming an image on an image forming medium P using a recording material such as a toner. For example, the image forming medium P is a sheet-like paper. The scanning function is a function of reading an image from a document on which the image is formed. The copying function is a function of printing the image read from the document through the scanning function on the image forming medium P by using the printing function. The decoloring function is a function of decoloring an image formed with a decolorable recording material on the image forming medium P. The image forming apparatus 10 can be logged in to by a registered user. The user logs in to the image forming apparatus 10 to be capable of using, for example, various functions. The image forming apparatus 10 is, for example, a processor 11, a Read-Only Memory (ROM) 12, a Random-Access Memory (RAM) 13, an auxiliary storage device 14, a communication interface 15, a control panel 16, an image forming section 17 and an image reading section 18. Then, these sections are connected to one another via a bus 19 or the like.

The processor 11 acts as a central component of a computer which performs processing such as an arithmetic processing and a control processing necessary for the operation of the image forming apparatus 10. The processor 11 executes programs such as system software, application software or firmware stored in the ROM 12 or the auxiliary storage device 14 to control each section to perform various functions of the image forming apparatus 10. The processor 11 is, for example, a Central Processing Unit (CPU), a Micro Processing Unit (MPU), a System on a Chip (SoC), a Digital Signal Processor (DSP), a Graphics Processing Unit (GPU), an Application Specific Integrated Circuit (ASIC), a Programmable Logic Device (PLD), or a Field-Programmable Gate Array (FPGA). Alternatively, the processor 11 may be a combination of plural ones among the above devices. The processor 11 is an example of a control section. The computer having the processor 11 as the central component thereof is an example of the control section.

The ROM 12 acts as a main storage component of the computer with the processor 11 as the central component. The ROM 12 is a non-volatile memory exclusively used for reading data. The ROM 12 stores the above programs. The ROM 12 stores data used for the processor 11 to perform various processing or various setting values.

The RAM 13 acts as a main storage component of the computer with the processor 11 as the central component. The RAM 13 is a memory used for reading and writing data. The RAM 13 is used as a so-called work area for storing data temporarily used for the processor 11 to perform various processing.

The auxiliary storage device 14 acts as an auxiliary storage device of the computer with the processor 11 as the central component. The auxiliary storage device 14 is, for example, an Electric Erasable Programmable Read-Only Memory (EEPROM), a Hard Disk Drive (HDD), a Solid State Drive (SSD), or the like. The auxiliary storage device 14 may store the above programs. The auxiliary storage device 14 stores data used by the processor 11 to perform various processing, data generated in a processing performed by the processor 11, or various setting values. In place of the auxiliary storage device 14 or in addition to the auxiliary storage device 14, the image forming apparatus 10 may include an interface into which a storage medium such as a memory card or a Universal Serial Bus (USB) memory can be inserted.

The programs stored in the ROM 12 or the auxiliary storage device 14 include a program for executing a processing described below. The program has a function of providing various Application Programming Interfaces (APIs). For example, the image forming apparatus 10 is transferred to an administrator of the image forming apparatus 10 with the program stored in the ROM 12 or the auxiliary storage device 14. However, the image forming apparatus 10 may be transferred to the administrator in a state in which the program is not stored in the ROM 12 or the auxiliary storage device 14. The image forming apparatus 10 may be transferred to the administrator with another program different from the above program stored in the ROM 12 or the auxiliary storage device 14. Then, the program for executing the processing described below may be separately transferred to the administrator, and may be written into the ROM 12 or the auxiliary storage device 14 through the operation performed by the administrator or a service person. The transfer of the program at this time may be realized by recording the program on a removable storage medium such as a magnetic disk, a magneto-optical disk, an optical disk, a semiconductor memory or the like, or by downloading the program via the network.

The permission can be set for the API. Alternatively, the permission may be set for the API by default. According to the setting of the permission, the image forming apparatus 10 can provide, for example, an API only available for a user who is the administrator, an API only available for a specific user, an API only available for a user during login, an API only available for a specific user group, and an API available for all users.

The programs stored in the auxiliary storage device 14 may include one or a plurality of application software (hereinafter referred to as "built-in application") for adding a function of the image forming apparatus 10. The built-in application is performed by calling the above API. For example, the image forming apparatus 10 is transferred to the administrator of the image forming apparatus 10 in a state in which the built-in application is not stored in the ROM 12 or the auxiliary storage device 14. Then, the built-in application separately transferred to the administrator may be written (e.g., installed) into the auxiliary storage device 14 or the like through the operation performed by the administrator or a service person. The transfer of the built-in application may be realized by recording the built-in application in a removable recording medium such as a magnetic disk, a magneto-optical disk, an optical disk, a semiconductor memory or the like, or by downloading the built-in application via the network.

An installation package of the built-in application includes, for example, a program code, an attribute file, signature data and a resource file. Among these, the attribute file includes various setting values for the built-in application. For example, the attribute file includes a value for instructing whether to enable or disable an automatic authentication function to the image forming apparatus 10 and a value for instructing whether to permit switching between enablement and disablement of the automatic authentication function to the image forming apparatus 10. The automatic authentication function is described below. At the time of installing the built-in application, the processor 11 generates an application setting for the built-in application based on each value included in the attribute file, and stores the generated application setting in the auxiliary storage device 14. For example, if the attribute file includes a value for instructing to enable the automatic authentication function, the application setting includes a value indicating that the automatic authentication function is enabled. If the attribute file includes a value for instructing to disable the automatic authentication function, the application setting includes a value indicating that the automatic authentication function is disabled. Then, if the attribute file includes a value for instructing to permit the switching between the enablement and disablement of the automatic authentication function, the application setting includes a value indicating that the switching between enablement and disablement of the automatic authentication function is permitted. If the attribute file includes a value for instructing to prohibit the switching between enablement and disablement of the automatic authentication function, the application setting includes a value indicating that the switching between enablement and disablement of the automatic authentication function is prohibited. A state in which the application setting includes the value indicating that the automatic authentication function is enabled is an example of a first state. A state in which the application setting includes the value indicating that the automatic authentication function is disabled is an example of a second state. A device that stores the application setting is an example of a storage section. Thus, the auxiliary storage device 14 is an example of the storage section.

The communication interface 15 is an interface through which the image forming apparatus 10 performs communication via the network or the like.

The control panel 16 includes buttons and a touch panel to be operated by an operator of the image forming apparatus 10. The touch panel is, for example, formed by superimposing a display such as a liquid crystal display or an organic Electro-Luminescence (EL) display and a pointing device such as a touch pad. Therefore, the buttons and the touch panel function as input devices for receiving an operation performed by the operator of the image forming apparatus 10. The display of the touch panel functions as a display device for providing various kinds of information to the operator of the image forming apparatus 10. The image forming apparatus 10 may have a microphone as the input device. Then, in such an image forming apparatus 10, an operation input by sound recognition using sound input from the microphone may be enabled.

The image forming section 17 prints an image on the image forming medium P by forming an image using a toner or ink. For example, the image forming section 17 may be a laser printer, an inkjet printer, or another type of printer to perform printing.

The image reading section 18 reads an image from a document. The image reading section 18 is a scanner for reading the image from the document. For example, the scanner is a scanner of an optical reduction system provided with an image capturing element such as a Charge-Coupled Device (CCD) image sensor. Alternatively, the scanner may be a scanner of a Contact Image Sensor (CIS) system provided with an image capturing element such as a Complementary Metal-Oxide-Semiconductor (CMOS) image sensor. The scanner may be a scanner of another known system.

The bus 19 is a control bus, an address bus, a data bus, or the like, and transmits signals transmitted and received among respective sections of the image forming apparatus 10.

The communication apparatus 20 is a Personal Computer (PC), a server, a tablet PC, a smart phone, or the like. The communication apparatus 20 has a function of operating the image forming apparatus 10 via the network NW. For example, the communication apparatus 20 includes a processor 21, a ROM 22, a RAM 23, an auxiliary storage device 24, a communication interface 25, a display device 26 and an input device 27. Then, these sections are connected to one another via a bus 28 and the like.

The processor 21 acts as a central component of a computer which performs processing such as an arithmetic processing and a control processing necessary for the operation of the communication apparatus 20. The processor 21 executes programs such as system software, application software or firmware stored in the ROM 22 or the auxiliary storage device 24 to control each section to perform various functions of the communication apparatus 20. The processor 21 is, for example, a CPU, an MPU, an SoC, a DSP, a GPU, an ASIC, a PLD, an FPGA or the like. Alternatively, the processor 21 may be a combination of plural ones among the above devices.

The ROM 22 acts as a main storage component of the computer with the processor 21 as the central component. The ROM 22 is a non-volatile memory exclusively used for reading data. The ROM 22 stores the above programs. The ROM 22 stores data used for the processor 21 to perform various processing or various setting values.

The RAM 23 acts as a main storage component of the computer with the processor 21 as the central component. The RAM 23 is a memory used for reading and writing data. The RAM 23 is used as a so-called work area for storing data temporarily used for the processor 21 to perform various processing.

The auxiliary storage device 24 acts as an auxiliary storage device of the computer with the processor 21 as the central component. The auxiliary storage device 24 is, for example, an EEPROM, an HDD, an SSD, or the like. The auxiliary storage device 24 may store the above programs. The auxiliary storage device 24 stores data used by the processor 21 to perform various processing, data generated in a processing performed by the processor 21, or various setting values.

The programs stored in the ROM 22 or the auxiliary storage device 24 include a program for executing a processing described below. For example, the communication apparatus 20 is transferred to an administrator of the communication apparatus 20 with the program stored in the ROM 22 or the auxiliary storage device 24. However, the communication apparatus 20 may be transferred to the administrator or the like in a state in which the program is not stored in the ROM 22 or the auxiliary storage device 24. The communication apparatus 20 may be transferred to the administrator with another program different from the above program stored in the ROM 22 or the auxiliary storage device 24. Then, the program for executing the processing described below may be separately transferred to the administrator, and may be written into the ROM 22 or the auxiliary storage device 24 through the operation performed by the administrator or a service person. The transfer of the program at this time may be realized by recording the program in a removable storage medium such as a magnetic disk, a magneto-optical disk, an optical disk, a semiconductor memory or the like, or by downloading the program via the network NW.

The communication interface 25 is an interface through which the communication apparatus 20 performs communication via the network NW or the like.

The display device 26 displays a screen for providing various kinds of information to an operator of the communication apparatus 20. The display device 26 is, for example, a display such as a liquid crystal display or an organic EL display. A touch panel may also be used as the input device 27 and the display device 26. Specifically, a display panel of the touch panel can be used as the display device 26, and a touch pad of the touch panel can be used as the input device 27.

The input device 27 receives an operation performed by the operator of the communication apparatus 20. The input device 27 is, for example, a keyboard, a keypad, a touch pad, a mouse, or the like. A touch panel may also be used as the display device 26 and the input device 27. Specifically, a display panel of the touch panel can be used as the display device 26, and a touch pad of the touch panel can be used as the input device 27.

The bus 28 includes a control bus, an address bus, a data bus, and the like, and transmits signals transmitted and received by each section of the communication apparatus 20.

Figure 2:
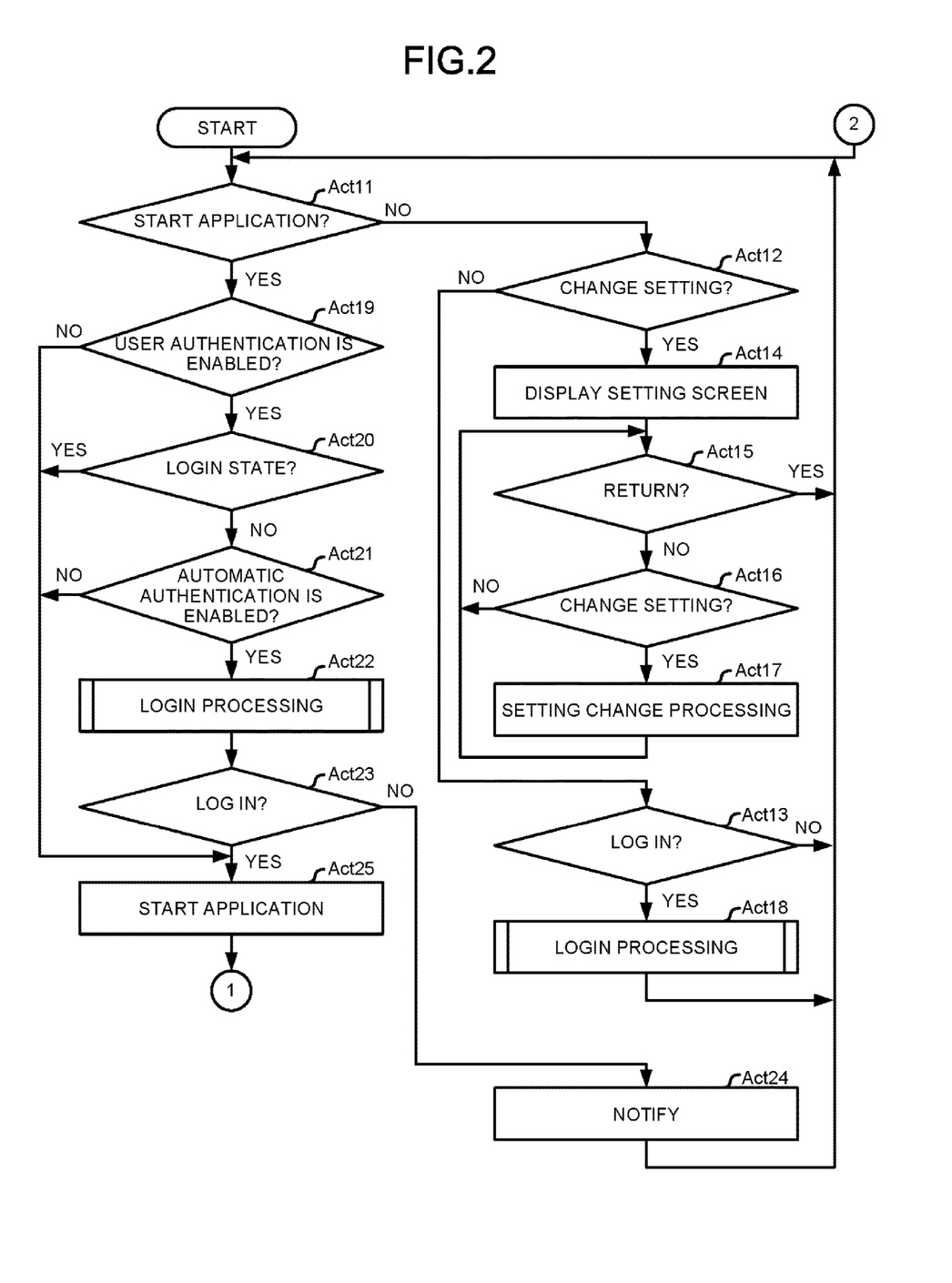
FIG. 2 is a flowchart depicting a processing performed by a processor of the image forming apparatus in FIG. 1 according to the first embodiment.
Figure 3:
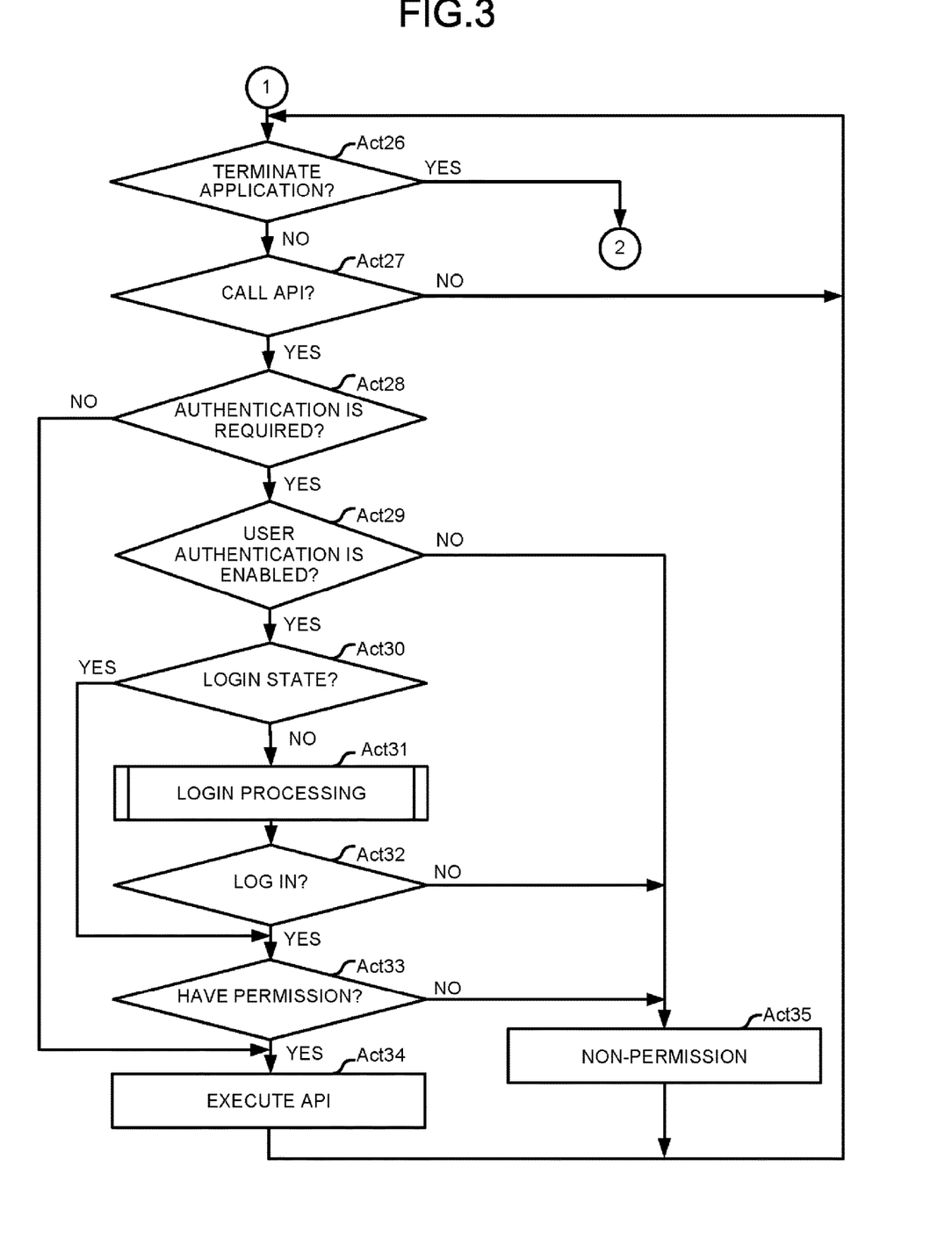
FIG. 3 is a flowchart depicting a processing performed by the processor of the image forming apparatus in FIG. 1 according to the first and second embodiments.
Figure 4:
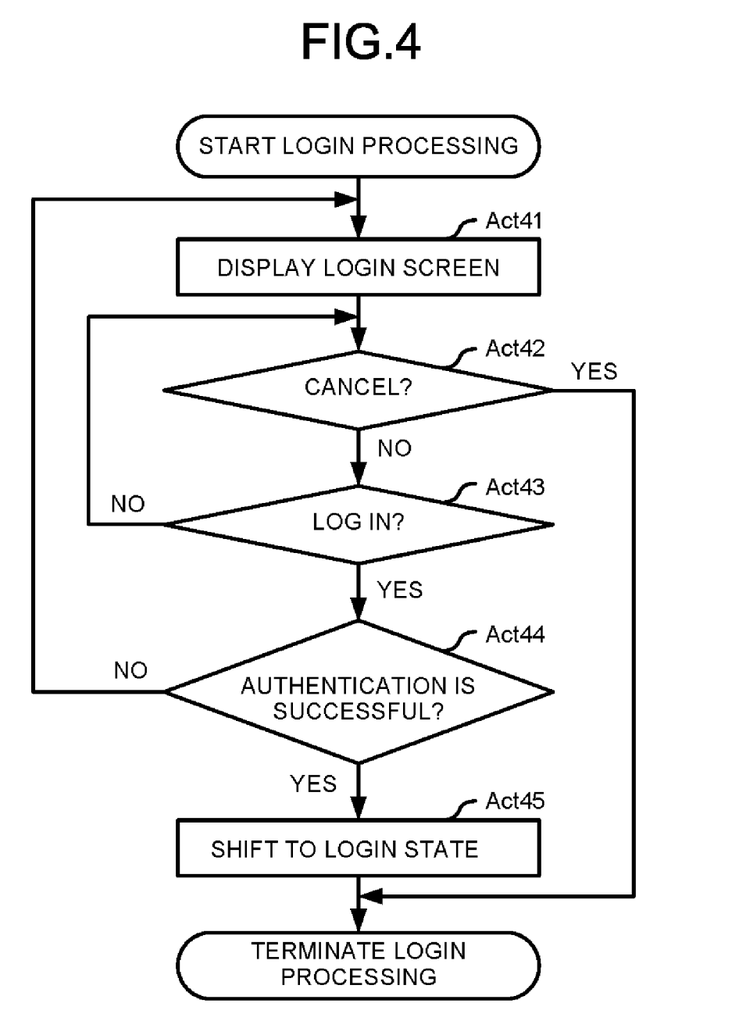
FIG. 4 is a flowchart depicting a processing performed by the processor of the image forming apparatus in FIG. 1 according to the first and second embodiments.

Below, an operation of the image forming apparatus 10 according to the first embodiment is described with reference to FIG. 2 to FIG. 4. The contents of a processing in the following operation description are merely an example, and various processing capable of achieving the same results can be appropriately used. FIG. 2 to FIG. 4 are flowcharts depicting a processing performed by the processor 11 of the image forming apparatus 10. The processor 11 executes the processing by executing the program stored in the ROM 12 or the auxiliary storage device 14. If the processor 11 proceeds to the processing in Act (N+1) (N is a natural number) after the processing in Act N, the description relating to such transition may be omitted below.

In Act 11, the processor 11 determines whether or not an instruction to start the built-in application is made. For example, the processor 11 determines that the instruction to start the built-in application is made when an operation for starting the built-in application is performed on the control panel 16. For example, the processor 11 determines that the instruction to start the built-in application is made when a command for instructing to start the built-in application is input from another program. For example, the processor 11 determines that the instruction to start the built-in application is made when a command for instructing to start the built-in application is transmitted from the communication apparatus 20. If it is determined that the instruction to start the built-in application is not made, the processor 11 takes No in Act 11 and proceeds to the processing in Act 12.

Through the above, the processor 11 performs the processing in Act 11 to operate as a receiving section that receives a start instruction of an application. Alternatively, the computer with the processor 11 as the central component performs the processing in Act 11 to operate as the receiving section.

In Act 12, the processor 11 determines whether or not an instruction to display a setting screen for confirming and changing the setting is made. For example, the processor 11 determines that the instruction to display the setting screen is made when an operation for instructing to display the setting screen is performed on the control panel 16. For example, the processor 11 determines that the instruction to display the setting screen is made when a command for instructing to display the setting screen on the control panel 16 is transmitted from the communication apparatus 20. If it is determined that the instruction to display the setting screen is not made, the processor 11 takes No in Act 12 and proceeds to the processing in Act 13.

In Act 13, the processor 11 determines whether or not an instruction to start a login processing is made. For example, the processor 11 determines that the instruction to start the login processing is made when an operation for instructing to start the login processing is performed on the control panel 16. For example, the processor 11 determines that the instruction to start the login processing is made when a command for instructing to start the login processing is transmitted from the communication apparatus 20. If the operation to start the login processing is not performed, the processor 11 takes No in Act 13 and returns to the processing in Act 11. Thus, the processor 11 repeats the processing in Act 11 to Act 13 until the instruction to start the built-in application, the instruction to display the setting screen or the operation to start the login processing is made.

If the instruction to display the setting screen is made in the standby state in Act 11 to Act 13, the processor 11 takes Yes in Act 12 and proceeds to the processing in Act 14.

In Act 14, the processor 11 generates an image corresponding to the setting screen. Then, the processor 11 instructs the control panel 16 to display the generated image. In response to the instruction, the touch panel of the control panel 16 displays a setting screen. The setting screen includes current setting values of various settings. The setting screen includes a return button for terminating the display of the setting screen. Furthermore, the setting screen includes buttons for changing various settings.

In Act 15, the processor 11 determines whether or not an operation for terminating the display of the setting screen is performed. Specifically, the processor 11 determines whether or not a predetermined operation such as operating the return button is performed. If the operation for terminating the display of the setting screen is not performed, the processor 11 takes No in Act 15, and proceeds to the processing in Act 16.

In Act 16, the processor 11 determines whether or not an operation for changing various settings is performed. Specifically, the processor 11 determines whether or not a predetermined operation such as operating buttons for changing various settings is performed. If the operation for changing various settings is not performed, the processor 11 takes No in Act 16, and returns to the processing in Act 15. Thus, the processor 11 repeats the processing in Act 15 and Act 16 until the operation for terminating the display of the setting screen is performed or the operation for changing various settings is performed. If the operation for terminating the display of the setting screen is performed in the standby state in Act 15 and Act 16, the processor 11 takes Yes in Act 15, and returns to the processing in Act 11.

If the operation for changing various settings is performed in the standby state in Act 15 and Act 16, the processor 11 takes Yes in Act 16, and proceeds to the processing in Act 17. In Act 17, the processor 11 stores various setting values in the auxiliary storage device 14 based on the input by the operator. After the processing in Act 17, the processor 11 returns to the processing in Act 15. The various settings stored in Act 17 include, for example, two types of settings including an "application setting" and a "main body setting". The application setting is made for each of the built-in applications installed in the image forming apparatus 10. Each application setting is enabled only for a specific built-in application. However, the specific built-in application may include a plurality of built-in applications. Unlike the application setting, the main body setting is made for the image forming apparatus 10 rather than for a specific built-in application. The main body setting includes, for example, a setting indicating whether or not the user authentication function is enabled or disabled. The user authentication function is a function that allows a user to log in to the image forming apparatus 10. If the user authentication function is disabled, the user cannot log in to the image forming apparatus 10.

If the operation for starting the login processing is performed in the standby state in Act 11 to Act 13, the processor 11 takes Yes in Act 13, and proceeds to the processing in Act 18. The processor 11 performs control so as not to perform the operation for starting the login processing at the time the user authentication function is set to be disabled in the main body setting. Alternatively, if the operation for starting the login processing is performed at the time the user authentication function is set to be disabled in the main body setting, the processor 11 may determine that the operation for starting the login processing is not performed, and take No in Act 13. In Act 18, the processor 11 executes the login processing shown in FIG. 4.

In Act 41, the processor 11 generates an image corresponding to a login screen. Then, the processor 11 instructs the touch panel of the control panel 16 to display the generated image. In response to the instruction, the touch panel displays the login screen. Alternatively, if the login processing is started in response to an instruction from the communication apparatus 20, the processor 11 controls the display device 26 of the communication apparatus 20 to display the login screen. The login screen includes, for example, an input field for inputting an identifier (ID) and a password necessary for login, a login button for instructing execution of the login, and a cancel button for canceling the login. The ID is, for example, an identification code uniquely assigned to each user.

In Act 42, the processor 11 determines whether or not the cancel button is operated. If the cancel button is not operated, the processor 11 takes No in Act 42, and proceeds to the processing in Act 43.

In Act 43, the processor 11 determines whether or not the login button is operated in a state in which the password and the ID are input. If the login button is not operated, the processor 11 takes No in Act 43, and returns to the processing in Act 42. Thus, the processor 11 repeats the processing in Act 42 and Act 43 until the cancel button is operated or the login button is operated in a state in which the password and the ID are input.

If the cancel button is operated in the standby state in Act 42 and Act 43, the processor 11 takes Yes in Act 42, and then terminates the login processing shown in FIG. 4.

If the login button is operated in a state in which the password and the ID are input in the standby state in Act 42 and Act 43, the processor 11 takes Yes in Act 43, and proceeds to the processing in Act 44.

In Act 44, the processor 11 determines whether or not the combination of the ID and the password is correct. Then, the processor 11 determines that the authentication is successfully performed if the combination of the ID and the password is correct. If it is determined that the combination of the ID and the password is not correct and the authentication fails, the processor 11 takes No in Act 44, and returns to the processing in Act 41. At this time, the processor 11 performs control to display a message indicating that the login fails in the login screen. On the other hand, if it is determined that the authentication is successfully performed, the processor 11 takes Yes in Act 44, and proceeds to the processing in Act 45.

In Act 45, the processor 11 changes the state of the image forming apparatus 10 to the login state. For example, the processor 11 controls the image forming apparatus 10 to perform an operation based on the setting performed by the user during login. Here, the user specified by the input ID is a login person. After the processing in Act 45, the processor 11 terminates the login processing shown in FIG. 4. In the above description of the processing shown in FIG. 4, as an example, the login is performed using the combination of the ID and the password. However, the login may be performed by other methods. For example, the login may be performed using biometric authentication such as fingerprint authentication or face authentication. For example, the login may be performed using an IC card or the like. The processor 11 returns to the processing in Act 11 after terminating the login processing in Act 18 in FIG. 2.

If the instruction to start the built-in application is made in the standby state in Act 11 to Act 13, the processor 11 takes Yes in Act 11, and proceeds to the processing in Act 19. The built-in application instructed to be started here is hereinafter referred to as a "target application". In Act 19, the processor 11 determines whether or not the user authentication function is enabled in the main body setting. If the user authentication function is enabled, the processor 11 takes Yes in Act 19, and proceeds to the processing in Act 20.

In Act 20, the processor 11 determines whether or not the image forming apparatus 10 is in the login state. If the image forming apparatus 10 is not in the login state, i.e., if it is in a logout state, the processor 11 takes No in Act 20, and proceeds to the processing in Act 21.

In Act 21, the processor 11 determines whether or not the automatic authentication function of the target application is enabled in the application setting for the target application. The automatic authentication function is a function that automatically executes the login processing if the image forming apparatus 100 is not in the login state at the time the built-in application is started. If the automatic authentication function is enabled, the processor 11 takes Yes in Act 21, and proceeds to the processing in Act 22. In the application setting, enablement and disablement of the automatic authentication function can be switched. However, if the application setting is a setting that does not permit the switching between enablement and disablement (i.e., including a value indicating that the switching between enablement and disablement is not permitted), the user cannot switch enablement and disablement of the automatic authentication function.

In Act 22, the processor 11 executes the login processing shown in FIG. 4. After terminating the login processing, the processor 11 proceeds to the processing in Act 23 in FIG. 2.

In Act 23, the processor 11 determines whether or not the state of the image forming apparatus 10 is changed to the login state through the login processing in Act 22. If the state of the image forming apparatus 10 is not changed to the login state through the login processing in Act 22, the processor 11 takes No in Act 23, and proceeds to the processing in Act 24.

In Act 24, the processor 11 notifies the operator that the target application is not started because the image forming apparatus 10 is not in the login state. For example, the processor 11 controls the touch panel of the control panel 16 to display a message indicating that the target application is not started because the image forming apparatus 10 is not in the login state. After the processing in Act 24, the processor 11 returns to the processing in Act 11.

On the other hand, if the state of the image forming apparatus 10 is changed to the login state through the login processing in Act 22, the processor 11 takes Yes in Act 23, and proceeds to the processing in Act 25. If the user authentication function is disabled, the processor 11 takes No in Act 19, and proceeds to the processing in Act 25. If the image forming apparatus 10 is in the login state, the processor 11 takes Yes in Act 20, and proceeds to the processing in Act 25. If the automatic authentication function is disabled, the processor 11 takes No in Act 21, and proceeds to the processing in Act 25.

The processor 11 starts the target application in Act 25. The processor 11 proceeds to the processing in Act 26 in FIG. 3 after the processing in Act 25.

In Act 26, the processor 11 determines whether or not an instruction to terminate the target application is made. If the instruction to terminate the built-in application started in Act 25 is not made, the processor 11 takes No in Act 26, and proceeds to the processing in Act 27.

In Act 27, the processor 11 determines whether or not an instruction to call an API is made from the target application. If the instruction to call the API is not made, the processor 11 takes No in Act 27, and returns to the processing in Act 26. Thus, the processor 11 repeats the processing in Act 26 and Act 27 until the instruction to terminate the target application or the instruction to call the API is made.

If the instruction to terminate the target application is made in the standby state in Act 26 and Act 27, the processor 11 takes Yes in Act 26, and returns to the processing in Act 11 in FIG. 2.

If the instruction to call the API is made in the standby state in Act 26 and Act 27 in FIG. 3, the processor 11 takes Yes in Act 27, and proceeds to the processing in Act 28. The API instructed to be called here is hereinafter referred to as a "target API".

In Act 28, the processor 11 determines whether or not the target API requires the authentication. If the target API requires the authentication, the processor 11 takes Yes in Act 28, and proceeds to the processing in Act 29.

In Act 29, the processor 11 determines whether or not the user authentication function is enabled in the main body setting. If the user authentication function is enabled, the processor 11 takes Yes in Act 29, and proceeds to the processing in Act 30.

In Act 30, the processor 11 determines whether or not the image forming apparatus 10 is in the login state. If the image forming apparatus 10 is not in the login state, the processor 11 takes No in Act 30, and proceeds to the processing in Act 31.

In Act 31, the processor 11 executes the login processing shown in FIG. 4. After terminating the login processing in Act 31, the processor 11 proceeds to the processing in Act 32 in FIG. 3. The login processing in Act 31 may be performed even when the user authentication function is disabled.

In Act 32, the processor 11 determines whether or not the state of the image forming apparatus 10 is changed to the login state through the login processing in Act 31. If the state of the image forming apparatus 10 is changed to the login state, the processor 11 takes Yes in Act 32, and proceeds to the processing in Act 33. If the image forming apparatus 10 is in the login state, the processor 11 takes Yes in Act 30, and proceeds to the processing in Act 33.

In Act 33, the processor 11 determines whether or not the user during login has the permission to call the target API. If the user during login has the permission to call the target API, the processor 11 takes Yes in Act 33, and proceeds to the processing in Act 34. If the target API does not require the authentication, the processor 11 takes No in Act 28, and proceeds to the processing in Act 34.

In Act 34, the processor 11 performs a processing of using the target API in response to the calling of the target API. After the processing in Act 34, the processor 11 returns to the processing in Act 26.

On the other hand, if the user authentication function is disabled, the processor 11 takes No in Act 29, and proceeds to the processing in Act 35. If the user during login does not have the permission to call the target API, the processor 11 takes No in Act 33, and proceeds to the processing in Act 35. If the state of the image forming apparatus 10 is not changed to the login state through the login processing in Act 31, the processor 11 takes No in Act 32, and proceeds to the processing in Act 35.

In Act 35, the processor 11 transmits information indicating that the calling of the target API is not permitted to the target application. After the processing in Act 35, the processor 11 returns to the processing in Act 26.

The image forming apparatus 10 of the first embodiment starts the built-in application if the image forming apparatus 10 is in the login state at the time of starting the built-in application. Then, the image forming apparatus 10 of the first embodiment starts the built-in application if the image forming apparatus 10 is not in the login state and the automatic authentication function is disabled. The image forming apparatus 10 of the first embodiment executes the login processing if the automatic authentication function is enabled but the image forming apparatus 10 is not in the login state. Then, the image forming apparatus 10 of the first embodiment starts the built-in application if the state thereof is changed to the login state through the login processing. On the other hand, the image forming apparatus 10 of the first embodiment does not start the built-in application if the state of the image forming apparatus 10 is not changed to the login state through the login processing. In other words, at the time the automatic authentication function is disabled, the image forming apparatus 10 of the first embodiment starts the built-in application regardless of whether the image forming apparatus 10 is in the login state. On the other hand, the image forming apparatus 10 of the first embodiment does not start the built-in application unless the image forming apparatus 10 is in the login state at the time the automatic authentication function is enabled. Therefore, the image forming apparatus 10 of the first embodiment can set whether or not the login is required at the time of start for each built-in application by only determining whether the automatic authentication function is enabled or disabled for each built-in application. In other words, the image forming apparatus 10 of the first embodiment can set whether or not the login is required for each application by a simple method.

In the image forming apparatus 10 of the first embodiment, whether the automatic authentication function is enabled or disabled is determined by a value included in the installation package of the built-in application. Therefore, a designer of the built-in application can enable the image forming apparatus 10 to perform a desired operation only by changing the value.

When the image forming apparatus 10 of the first embodiment is not in the login state, the image forming apparatus 10 starts the authentication processing at the time the built-in application call the API that can be used only in the login state. Therefore, by executing an operation of not calling the API that can be used only in the login state, the built-in application can be operated even if the image forming apparatus 10 is not in the login state. Therefore, the image forming apparatus 10 of the first embodiment can reduce unnecessary login operation, which saves the time and effort taken by the user.

Second Embodiment

The configurations of the image forming apparatus 10 and the communication apparatus 20 according to the second embodiment are the same as those of the image forming apparatus 10 and the communication apparatus 20 according to the first embodiment, and thus the description thereof is omitted.

The installation package of the built-in application in the second embodiment is described. The attribute file included in the installation package includes an API list. The API list is a list of APIs used in the built-in application. At the time of installing the built-in application, the processor 11 stores the API list in the auxiliary storage device 14 in association with the built-in application.

Figure 5:
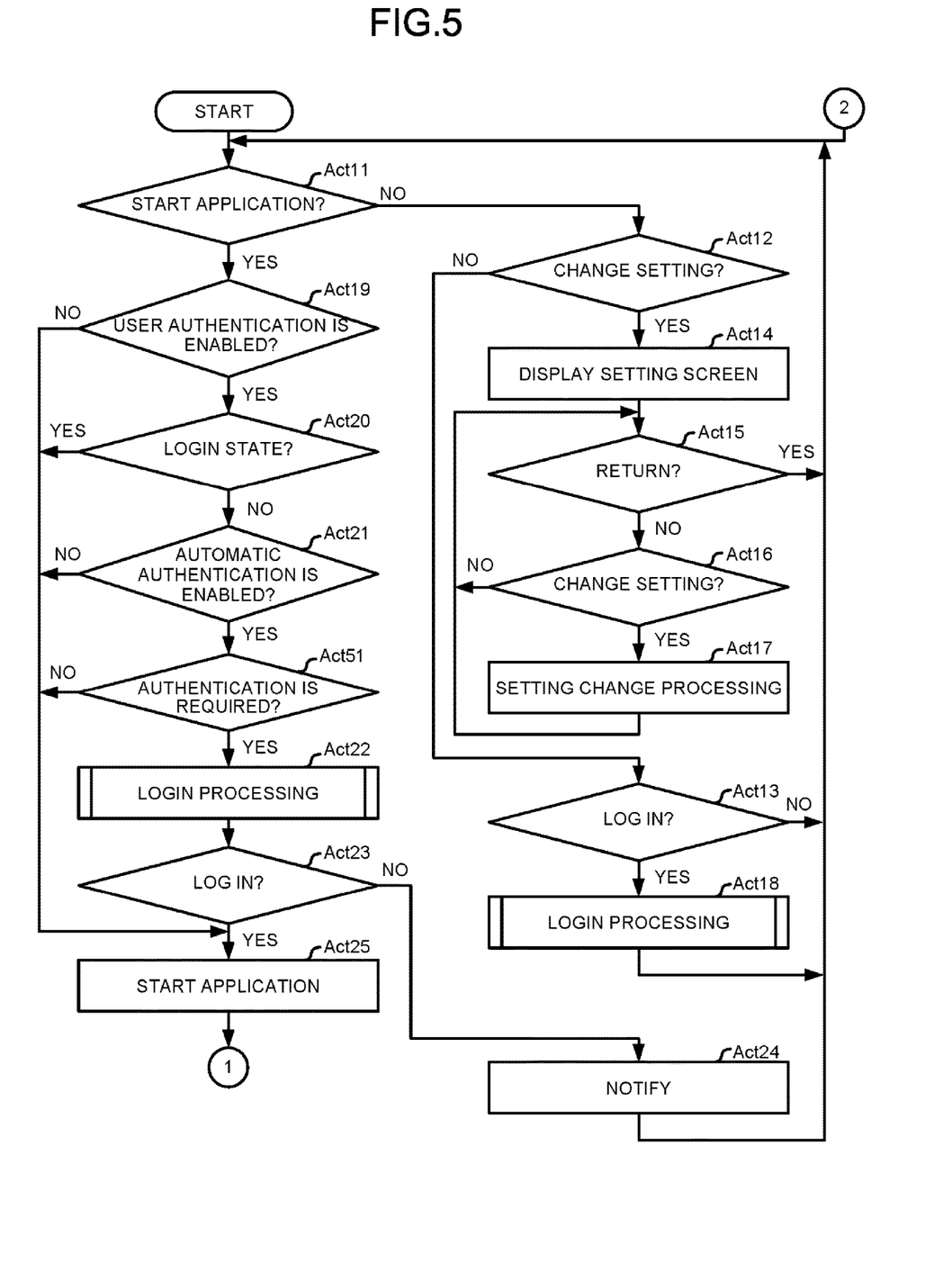
FIG. 5 is a flowchart depicting a processing performed by the processor of the image forming apparatus in FIG. 1 according to the second embodiment.

The operation of the image forming apparatus 10 according to the second embodiment is described below with reference to FIG. 3 to FIG. 5. The contents of the processing in the following operation description are merely an example, and various processing capable of achieving the same results can be appropriately used. The processor 11 executes the processing shown in FIG. 5 instead of that shown in FIG. 2 of the first embodiment. The processor 11 executes the processing shown in FIG. 3 and FIG. 4 as with the first embodiment. FIG. 5 is a flowchart depicting a processing performed by the processor 11 of the image forming apparatus 10. The processor 11 executes the processing according to a program stored in the ROM 12 or the auxiliary storage device 14.

If the processor 11 takes Yes in Act 21 in FIG. 5, the processor 11 proceeds to the processing in Act 51. In Act 51, the processor 11 determines whether or not the target application uses the API that requires the authentication. The processor 11 refers to, for example, the API list of the target application, and determines that the target application uses the API that requires the authentication when the API that requires the authentication is included in the API list. If it is determined that the target application uses the API that requires the authentication, the processor 11 takes Yes in Act 51, and proceeds to the processing in Act 22. On the other hand, if the processor 11 determines that the target application does not use the API that requires the authentication, the processor 11 takes No in Act 51, and proceeds to the processing in Act 25.

According to the image forming apparatus 10 of the second embodiment, the automatic authentication is not performed if the built-in application to be started has no possibility of using the API that requires authentication. In this way, the image forming apparatus 10 does not perform unnecessary authentication. Thus, the user of the image forming apparatus 10 can omit unnecessary login, which saves the time and effort taken by the user.

The above embodiment can be modified as follows. The image forming apparatus 10 may not start the application if the user authentication function is disabled.

The built-in application may be stored in another device. Another device is, for example, another image forming apparatus 10 or a server device. In this case, the image forming apparatus 10 starts the built-in application by communicating with another device. In this case, the image forming apparatus 10 may acquire the application setting from another device. The application setting acquired from other devices is stored, for example, in the RAM 13 or the auxiliary storage device 14.

In the above embodiment, if the application setting includes the value indicating that the automatic authentication function is enabled, the application setting indicates that the automatic authentication function is enabled, or contrarily, if the application setting includes the value indicating that the automatic authentication function is disabled, the application setting indicates that the automatic authentication function is disabled. However, if the application setting includes the value indicating that the automatic authentication function is enabled, the application setting indicates that the automatic authentication function is enabled, or contrarily, if the application setting does not include the value indicating that the automatic authentication function is enabled, the application setting may indicate that the automatic authentication function is disabled. In this case, the application setting including the value indicating that the automatic authentication function is enabled is an example of a setting indicating a first condition for permitting the start of the application in both the login state and the logout state. The application setting that does not include the value indicating that the automatic authentication function is enabled is an example of a setting indicating a second condition for permitting the start of the application only in the login state. If the application setting includes the value indicating that the automatic authentication function is disabled, the application setting indicates that the automatic authentication function is disabled, or contrarily, if the application setting does not include the value indicating that the automatic authentication function is disabled, the application setting may indicate that the automatic authentication function is enabled. In this case, the application setting including the value indicating that the automatic authentication function is disabled is an example of the setting indicating the second condition. The application setting that does not include the value indicating that the automatic authentication function is disabled is an example of the setting indicating the first condition. The application setting may include information other than the value for indicating whether the automatic authentication function is enabled or disabled.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a memory configured to store a setting indicating one of a first condition for permitting start of an application both in a login state and in a logout state and a second condition for permitting start of the application only in the login state;
an interface configured to receive a start instruction to start the application; and
a controller configured to:
install the application using an installation package, the installation package indicating whether to permit switching the setting between the first condition and the second condition;
control the memory to set the setting to indicate either the first condition or the second condition based on information contained within the installation package;
start the application if the image forming apparatus is in the login state or the logout state and the setting indicates the first condition;
start the application if the image forming apparatus is in the login state and the setting indicates the second condition; and
prevent the application from starting in response to the start instruction if the image forming apparatus is in the logout state and the setting indicates the second condition.

2. The image forming apparatus of claim 1, wherein the application is configured to call an API that can be used only in the login state, and wherein the controller permits calling of the API in a case in which the application was started while the image forming apparatus was in the logout state.

3. The image forming apparatus of claim 1, wherein the application is configured to call an API that can be used only in the login state, and wherein the controller permits calling of the API in a case in which the application was started while the image forming apparatus was in the logout state.

4. The image forming apparatus of claim 1, wherein:
the memory is configured to store a list of APIs used in the application; and
the controller is configured to start the application on condition that the image forming apparatus is in the login state if an API that can be used only in the login state is contained in the list in a case in which the first condition is set for the application, or starts the application if the API that can be used only in the login state is not contained in the list in response to the start instruction in the logout state.

5. The image forming apparatus of claim 1, wherein the application is a first application, wherein the setting is an application setting corresponding to the first application, and wherein the memory is configured to store a main body setting indicating one of a third condition or a fourth condition, the main body setting corresponding to both the first application and a second application; and
wherein the controller is configured to start the application in response to receiving the start instruction if the main body setting indicates the third condition.

6. The image forming apparatus of claim 1, further comprising at least one of (a) an image forming section configured to print an image on an image forming medium or (b) an image reading section configured to read an image from a document.

7. The image forming apparatus of claim 1, wherein the controller is further configured to:
receive a call instruction to call an API used by the application;
in response to receiving the call instruction while the image forming apparatus is in the login state, call the API;
in response to receiving the call instruction while the image forming apparatus is in the logout state, evaluate at least one credential corresponding to a user to determine if the at least one credential can be authenticated; and
in response to successfully authenticating the at least one credential, call the API.

8. The image forming apparatus of claim 1, wherein:
the setting is a first setting, the application is a first application, the start instruction is a first start instruction, and the installation package is a first installation package;
the memory is configured to store a second setting indicating one of a third condition for permitting start of a second application in both the login state and the in the logout state and a fourth setting for permitting start of the second application only in the login state;
the interface is configured to receive a second start instruction to start the second application; and
the controller is configured to:
control the memory to set the first setting to indicate the first condition based on the information contained within the first installation package;
install the second application using a second installation package;
control the memory to set the second setting to indicate the fourth condition based on information contained within the second installation package; and
prevent the second application from starting in response to the second start instruction if the image forming apparatus is in the logout state and second setting indicates the fourth condition.

9. The image forming apparatus of claim 1, wherein the installation package indicates that switching the setting between the first condition and the second condition is permitted.

10. The image forming apparatus of claim 1, wherein the installation package indicates that switching the setting between the first condition and the second condition is not permitted.

11. A method for controlling an image forming apparatus, comprising:
installing an application within a memory of the image forming apparatus using an installation package;
setting either a first condition or a second condition for the application based on information contained within the installation package, the first condition permitting starting the application both in a login state and a logout state, and the second condition permitting starting the application only in the login state;
starting the application if the first condition is set for the application;
starting the application on condition that the image forming apparatus is in the login state if the second condition is set for the application; and
preventing the application from starting on condition that the image forming apparatus is in the logout state if the second condition is set for the application,
the installation package including a setting that indicates whether to permit switching between (a) the first condition being set and (b) the second condition being set.

12. The method of claim 11, further comprising:
receiving an instruction to begin a login process;
evaluating at least one credential corresponding to a user to determine if the at least one credential can be authenticated; and
in response to successfully authenticating the at least one credential, changing the image forming apparatus from the logout state to the login state.

13. The method of claim 12, wherein the at least one credential includes a user ID and a password corresponding to the user.

14. The method of claim 12, wherein the at least one credential includes a biometric credential.

15. The method of claim 11, further comprising:
analyzing a list of APIs used in the application to determine if any of the APIs can only be used in the login state; and
in response to a determination that at least one of the APIs used in the application can only be used in the login state, preventing the application from starting if the image forming apparatus is in the logout state.

16. The method of claim 11, further comprising:
receiving a call instruction to call an API used by the application;
in response to receiving the call instruction while the image forming apparatus is in the login state, calling the API;
in response to receiving the call instruction while the image forming apparatus is in the logout state, evaluating at least one credential corresponding to a user to determine if the at least one credential can be authenticated; and
in response to successfully authenticating the at least one credential, calling the API.

17. The method of claim 11, wherein:
the application is a first application and the installation package is a first installation package; and
the method comprises:
installing a second application within the memory of the image forming apparatus using a second installation package;
setting the first condition for the first application based on the information contained within the first installation package;
setting a third condition for the second application based on information contained within the second installation package, the third condition permitting starting the second application only in the login state; and
starting the second application if the third condition is set for the second application.

18. An image forming apparatus, comprising:
a memory configured to store a setting indicating one of a first condition for permitting start of an application both in a login state and in a logout state and a second condition for permitting start of the application only in the login state;

a processor configured to:
install the application using an installation package, the installation package indicating whether to permit switching the setting between the first condition and the second condition;
control the memory to set the setting to indicate either the first condition or the second condition based on information contained within the installation package;
start the application if the image forming apparatus is in the logout state and the setting indicates the first condition;
start the application if the image forming apparatus is in the login state and the setting indicates the second condition;
after the application has started, receive a call instruction to call an API used by the application;
in response to receiving the call instruction while the image forming apparatus is in the login state, call the API;
in response to receiving the call instruction while the image forming apparatus is in the logout state, evaluate at least one credential corresponding to a user to determine if the at least one credential can be authenticated; and
in response to successfully authenticating the at least one credential, call the API.

19. The image forming apparatus of claim 18, wherein the application is a first application, wherein the setting is an application setting corresponding to the first application, and wherein the memory is configured to store a main body setting indicating one of a third condition or a fourth condition, the main body setting corresponding to both the first application and a second application; and
wherein the processor is configured to start the application in response to receiving a start instruction if the main body setting indicates the third condition.

20. The image forming apparatus of claim 18, further comprising at least one of (a) an image forming section configured to print an image on an image forming medium or (b) an image reading section configured to read an image from a document.

* * * * *